United States Patent
Barsness et al.

(10) Patent No.: US 8,813,082 B2
(45) Date of Patent: Aug. 19, 2014

(54) THREAD PRIORITY BASED ON OBJECT CREATION RATES

(75) Inventors: Eric L. Barsness, Pine Island, MN (US); John M. Santosuosso, Rochester, MN (US); John J. Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2053 days.

(21) Appl. No.: 11/425,846

(22) Filed: Jun. 22, 2006

(65) Prior Publication Data
US 2007/0300230 A1  Dec. 27, 2007

(51) Int. Cl.
*G06F 9/46* (2006.01)
*G06F 9/455* (2006.01)
*G06F 12/00* (2006.01)

(52) U.S. Cl.
USPC .............. 718/102; 718/103; 718/104; 718/1; 707/813

(58) Field of Classification Search
None
See application file for complete search history.

(56) References Cited

U.S. PATENT DOCUMENTS

| | | | | |
|---|---|---|---|---|
| 6,910,213 B1* | 6/2005 | Hirono et al. | ................. | 718/108 |
| 7,028,298 B1* | 4/2006 | Foote | ............................ | 718/104 |
| 7,370,327 B2* | 5/2008 | Trotter | ......................... | 718/104 |
| 7,454,571 B1* | 11/2008 | Sucharitakul | ................. | 711/129 |
| 7,565,652 B2* | 7/2009 | Janssen et al. | ................. | 718/103 |
| 2002/0073283 A1* | 6/2002 | Lewis et al. | ................... | 711/133 |
| 2002/0138506 A1* | 9/2002 | Shuf et al. | ..................... | 707/206 |
| 2006/0161762 A1* | 7/2006 | Eisen et al. | .................... | 712/233 |

OTHER PUBLICATIONS

Grzegorz Czajkowski; Thorsten Von Eicken; "JRes: a resource acounting interface for Java"; Conference on Object Oriented programming Sytems Languages and Application archive Proceedings of the 13th ACM SGPLAN conferenece on Object-oriented programming, sytems, languages, and applications pp. 21-34. Publication Date: 1998.*

* cited by examiner

*Primary Examiner* — Camquy Truong
(74) *Attorney, Agent, or Firm* — Patterson & Sheridan LLP

(57) ABSTRACT

A method and apparatus for managing thread priority based on object creation rates. Embodiments of the invention provide a thread monitor configured to reduce the execution priority of a thread creating a sufficient number of new objects to be disruptive of system performance. Thus, although the thread may still create a large number of objects, by monitoring object creation rates and reducing the execution priority of such a thread, overall system performance may be improved. In other words, a given thread may still "misbehave," but receive fewer opportunities to do so.

18 Claims, 5 Drawing Sheets

THREAD PRIORITY BASED ON OBJECT CREATION RATES

BACKGROUND OF THE INVENTION

1. Field of the Invention

The present invention is generally related to computer software application management. More particularly, the present invention is related to managing thread priority in multi-threaded application environments based on object creation rates.

2. Description of the Related Art

When working with multi-threaded application environments oftentimes a single thread can dominate the workload such that the thread's priority needs to be modified (lowered) to allow other work to continue. For example, in some cases a single "misbehaving" thread may create a disproportionate number of new objects each time the thread is executed. Because such a thread may be allocated memory from a common source, when it creates a disproportionate number of objects, the performance of each thread that shares the common memory source may suffer. This may occur because a garbage collector may be invoked to recover memory allocated to threads that share the same memory pool. Generally, a garbage collector may reclaim memory for an object created by a thread once the memory is no longer needed. However, on most application platforms used today, all threads suffer the penalty of waiting for the garbage collector to clean up objects. Therefore, when one object creates too many objects too quickly the performance of all threads active in a particular application environment will suffer. Further, if a "misbehaving" thread creates new objects at a very high rate, the garbage collector may be unable to keep up, and system performance may be substantially disrupted.

Currently, mechanisms exist for monitoring the performance of a multi-threaded application environment and for modifying the priority of a thread manually. For example, a method call may be invoked for a given thread to set the execution priority of that thread. These existing capabilities, however fall short of adjusting the execution priority of a thread priority when its determined that one thread is bottlenecking other threads in a multi-threaded environment. Further, current systems do not provide the ability to manage thread priority based on object creation rates. However, as described, a single thread that creates an excessive number of new objects is oftentimes disruptive of overall system performance Accordingly, there remains a need for a mechanism to monitor and adjust the execution priority of a thread in a multi-threaded environment, based on object creation rates.

SUMMARY OF THE INVENTION

Embodiments of the invention provide a thread monitor configured to reduce the execution priority of a thread creating a sufficient number of new objects to be disruptive of system performance. One embodiment of the invention includes a computer-implemented method of, managing thread priority based on object creation rates. The method generally includes, when a thread from the pool of active threads is dispatched for execution, monitoring an object creation rate for the thread. If the object creation rate of the thread exceeds a specified threshold, the method generally further includes reducing an execution priority of the thread.

Another embodiment of the invention includes a computer-readable storage medium containing a program which, when executed, performs an operation, for managing thread priority based on object creation rates. The operation generally includes, when a thread from the pool of active threads is dispatched for execution, monitoring an object creation rate for the thread. If the object creation rate of the thread exceeds a specified threshold, then the operation generally further includes reducing an execution priority of the thread.

Still another embodiment of the invention includes a computing device with a processor and a memory. The memory may store a program for managing thread priority based on object creation rates. The program is generally configured to, when a thread from the pool of active threads is dispatched for execution, monitor an object creation rate for the thread. If the object creation rate of the thread exceeds a specified threshold, then the program may be configured to reduce an execution priority of the thread.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
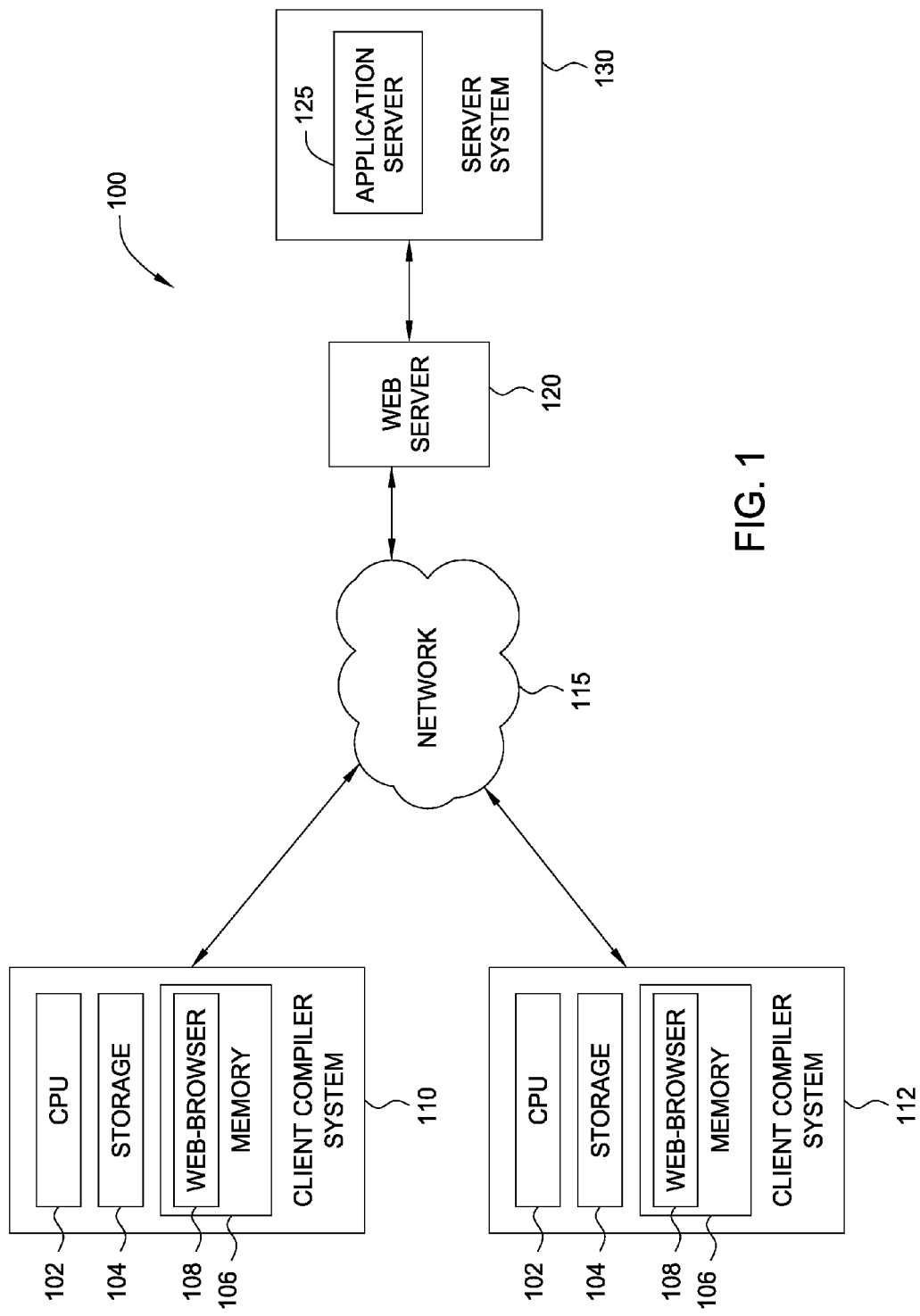
FIG. 1 is a block diagram that illustrates a client/server view of a computing environment, according to one embodiment of the invention.

Embodiments of the invention provide a method, system and article of manufacture for managing thread priority based on the rate at which a thread creates new objects. Common situations where a single thread may create enough new objects to disrupt system performance include, without limitation, the following:

Database Result set processing. Oftentimes a query result set object is sufficiently large enough that the number of objects a thread processing the query result set object creates can be quite cumbersome and tax the system being used.

In a Java® application environment, creating a bean object from a query result set object may itself involve creating a large number of objects.

Creating and parsing of extended markup language (XML) documents often requires creating a large number of objects.

A thread processing data from an incoming socket connection often requires creating a large number of objects In any of these (and other) cases, embodiments of the invention provide a thread monitor configured to reduce the execution priority of a thread that is creating a sufficient number of new objects to be disruptive of system performance. Thus, although a "misbehaving" thread may still create a large number of objects, by monitoring object creation rates and reducing the execution priority of such a thread, overall system performance may be improved. In other words, a given thread may still "misbehave," but receive fewer opportunities to do so.

Similarly, one familiar with Java® application environments (e.g., a J2EE application server such as IBM's WebSphere® application server) will recognize that certain groups of threads may be used to perform similar tasks (e.g., a pool of worker threads used to respond to user requests). If the general task assigned to be performed by a group of threads is one where an individual thread may create enough objects to be disruptive of system performance, embodiments of the invention may be used to manage thread priority for the entire group of threads. For example, embodiments of the invention may be configured to monitor the priority assigned to groups of threads by adjusting the priority of each member of a related group of threads based on the object creation rate of any individual member of the group.

Embodiments of the invention are described herein relative to the widely used Java® programming language and implementations of the Java® virtual machine (JVM) and application server available from Sun Microsystems and/or IBM. However, the invention is not limited to the Java® application platform and related programming environment and application servers. Rather, embodiments of the invention may be adapted for use with other multi-threaded application environments (including environments using kernel- or user-level threads), whether now known or later developed.

Further, in the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a computer software application(s) for use in, for example, the computing environment 100 shown in FIG. 1 and described below. Such application(s) define functions of the embodiments (including the methods described herein) and can be stored on a variety of computer-readable media. Illustrative computer-readable media include, but are not limited to: (i) information permanently stored on non-writable storage media (e.g., read-only memory devices within a computer such as CD/DVD-ROM disks readable by a CD/DVD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks and stored on tangible storage media. Such computer-readable media, when carrying computer-readable instructions that direct the functions of the present invention, represent embodiments of the present invention.

FIG. 1 is a block diagram that illustrates a client/server view of a computing environment 100, according to one embodiment of the invention. As shown, computing environment 100 includes two client computer systems 110 and 112, network 115, web server 120, and server system 130.

Client systems 110 and 112 provide a simplified representation of a variety existing computer systems, e.g., desktop computers, server computers, laptop computers, tablet computers, and the like. Additionally, client systems 110 and 112 are representative of other computing devices such as PDA's (personal digital assistants) and WML (wireless markup language) enabled mobile phones. The invention, however, is not limited to any particular computing system, device or platform and may be adapted to take advantage of new computing systems and devices as they become available. Network 115 represents any suitable network, including small local area networks, corporate intranets, large wide area networks such as the Internet, or any combination thereof. Those skilled in the art will recognize that the computing environment 100 shown in FIG. 1 are simplified to highlight aspects of the present invention and that computing systems and data communication networks typically include a variety of additional elements not shown in FIG. 1.

As shown, client computer systems 110 and 112 each include a CPU 102, storage 104 and memory 106, typically connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. Illustratively, memory 106 of computer systems 110 and 112 include a web server 108. Typically, web browser 108 is a software application that allows end users to request information from web server 120. In one embodiment, web server 120 may be configured to broker requests between client web browsers 108 and application server 125 running on server system 130. Also, although shown in FIG. 1 as separate components, those skilled in the art will recognize that web server 120 and application server 125 may be software applications running on the same computer system.

Figure 2:
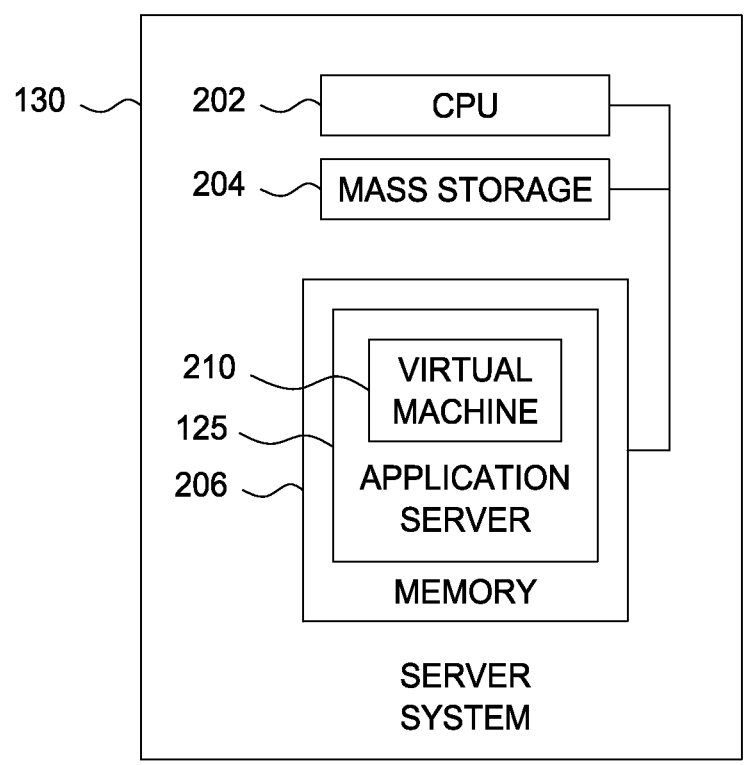
FIG. 2 is a block diagram that illustrates aspects of an application server, according to one embodiment of the invention.

FIG. 2 is a block diagram that further illustrates aspects of server system 130, according to one embodiment of the invention. Like client systems 110 and 112, server system 130 also includes a CPU 202, storage 204 and memory 206, connected by bus 208. As shown, memory 206 includes application server 125. For example, the WebSphere® application server and related applications and tools, available from IBM® may be used. However, embodiments of the invention may be adapted for use with other application servers.

Illustratively, application server 125 further includes a virtual machine 210 which may be used to execute programs written for the application server 125. For example, the WebSphere® application server includes an implementation of the Java® virtual machine (JVM) and may be used to execute Java® servlets. In the WebSphere® environment, servlet requests may be randomly assigned to one of a number of worker threads available from a thread pool. Depending on the execution parameters and the configuration of virtual machine 210 and application server 125, when such a worker thread is executed, the thread may create a few objects or may create millions of objects. Often times, a request to invoke the same servlet request with different parameters may result in a vast difference in the number of object creates. Further, the same worker thread may be assigned several servlet requests in a row. In one embodiment, the application server 125 may be configured to manage the priority of worker threads based on object creation rates that occur when the threads are used to execute servlets in response to user requests. Of course, virtual machine 210 (e.g., an implementation of the JVM) may be used in a variety of application environments and may be used to execute a variety of application programs, including applets, servlets and standalone applications (e.g., Java® bytecode). Accordingly, the use of a virtual machine 210 by application server 125 is used to illustrate an embodiment of the present invention.

Figure 3:
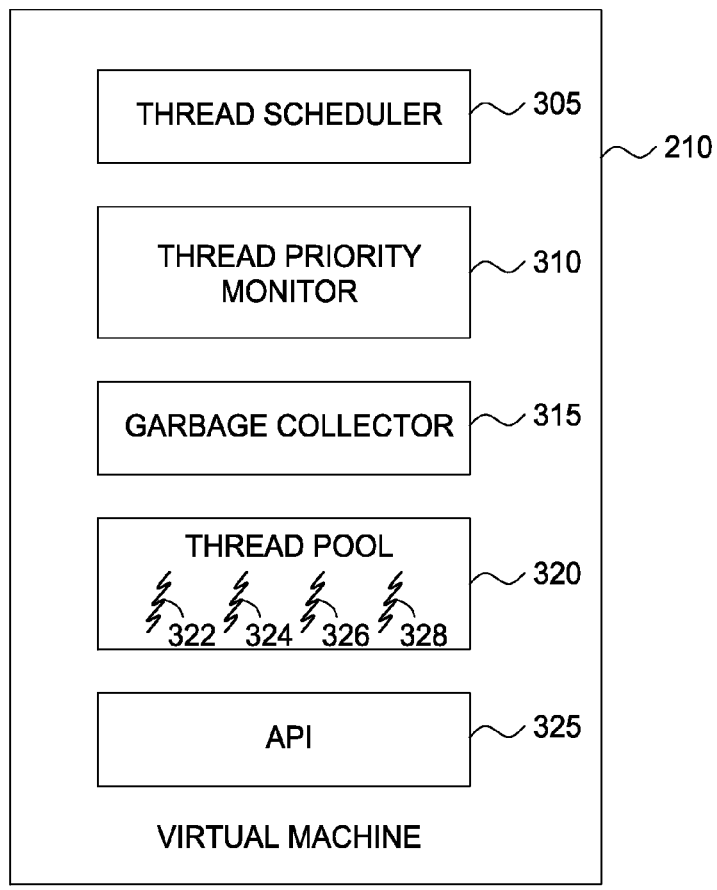
FIG. 3 is a block diagram that illustrates aspects of a multi-threaded, garbage collected virtual machine, according to one embodiment of the invention.

FIG. 3 is a block diagram that further illustrates aspects of virtual machine 210, according to one embodiment of the invention. In general, virtual machine 210 is representative of a multi-threaded, garbage collected virtual machine, such as the JVM used by the WebSphere® application server. As shown, virtual machine 210 includes a thread scheduler 305, a thread priority monitor 310, a garbage collector 316, thread pool 320 and application programmer interface (API) 325.

In one embodiment, thread scheduler 305 is configured to manage a sequence of execution of threads 322, 324, 326 and 328 in thread pool 320. As is known, a thread provides a basic unit of execution for a software application. Thus, each thread 322, 324, 326, and 328 represents a sequence of instructions that may be executed in parallel with other threads, either by time slicing or multiprocessing (or both). Generally, thread scheduler 305 selects which thread to dispatch for execution using a scheduling algorithm. For example, threads executed by a Java® virtual machine may include a thread priority ranging from 1 to 10. When initially created, each thread may be assigned a priority of 5. Thereafter, the thread, or the virtual machine 210, may adjust the priority of a thread from this initial setting.

When thread scheduler 305 dispatches one of threads 322, 324, 326 or 328 for execution, the thread may allocate any number of objects. For example, programs written in the Java® programming language may include calls to the "new" operator. The "new" operator causes virtual machine 210 to allocate memory for an object specified in the call to the "new" operator. The more objects that a thread creates, the less memory that is available for other threads. When the amount of available memory falls below a certain threshold (e.g., a specific number of bytes or percentage of memory) garbage collector 315 may be invoked to reclaim memory allocated to an object that is no longer in use by any thread currently in thread pool 320. The precise conditions that trigger garbage collector 315 may be configured to suit the needs in a particular case.

If a single thread creates a sufficient number of objects, then the garbage collector 315 may interrupt executing that thread to perform a garbage collection cycle. If such a thread continues to create a large number of objects (or a small number of objects with large memory requirements) after a garbage collection cycle, then garbage collector 315 may end up being triggered multiple times. Depending on how much memory such a thread is requesting, the impact on overall system performance may be substantial, as all of the threads in thread pool 320 wait for possibly multiple garbage collection cycles to be completed.

In one embodiment, the actions of thread scheduler 305, thread pool 320, and the object creation rates of threads 322, 324, 326 and 328 may be monitored by thread priority monitor 310. When the thread priority monitor 310 determines that a particular thread is creating a disproportionate number of objects when that thread is executed, the thread priority monitor 310 may be configured to reduce the priority of such a thread. Additionally, thread priority monitor 310 may be further configured to increase or reset a the priority assigned to a given thread, if after continued monitoring the thread priority monitor 310 determines that the object creation rate for a given thread has fallen back below the creation rate thresholds set for a particular virtual machine 210.

Although, thread priority monitor 310 is shown integrated with virtual machine 310, one of skill in the art will recognize that a number of alternate configurations are possible. For example, API 325 may provide the appropriate methods to implement thread priority monitor 310 "outside" of the virtual machine 325. In such a case, API 325 may include methods for determining which threads are dispatched for execution, the number of objects that are created when the thread is executed, and for adjusting the priority of a thread with an object creation rate that exceeds the limits set by thread priority monitor 310 in a particular case.

Figure 4:
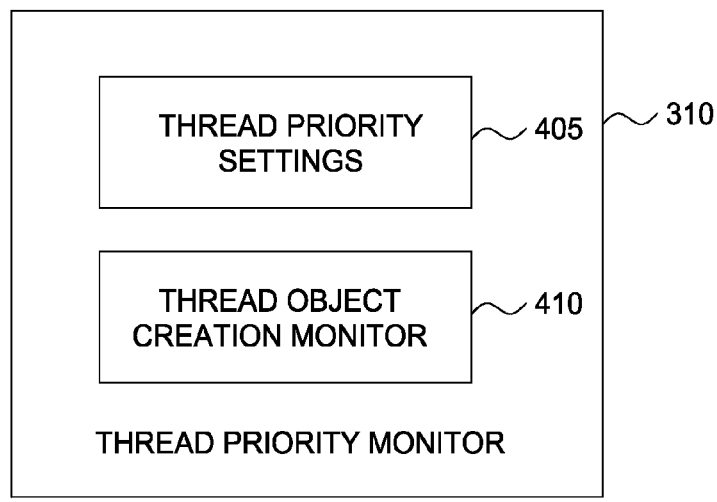
FIG. 4 is a block diagram that illustrates aspects of a thread priority monitor, according to one embodiment of the invention.

FIG. 4 is a block diagram that further illustrates aspects of thread priority monitor 310, according to one embodiment of the invention. Illustratively, thread priority monitor 310 includes thread priority settings 405 and thread object creation monitor 410. In one embodiment, thread object creation monitor 410 may be configured to determine a thread creation rate for a thread each time that thread is executed. Typically, thread object creation monitor 410 may use a counter initialized to zero each time a thread is dispatched for execution to determine an object creation rate. For example, for worker threads that execute servlets in the WebSphere® application server environment, servlet filters may be used to monitor when a given thread begins or ends executing, and the number of objects created may be monitored accordingly. Alternatively, times when object creation counts may start or stop may be adjusted programmatically using API 325. This may allow object creation rates to be monitored only during certain times, or for threads performing certain tasks.

Thread priority settings 410 may be used to specify values for determining whether a given thread is "misbehaving," based on object creation rates. For example, thread priority settings 410 may specify how many objects a thread may create or how fast a thread may create new objects before triggering a change in that thread's execution priority. Illustratively, thread priority settings 405 may specify a threshold count in raw number of objects (to account for an object creating a large number of small objects), raw memory allocated by a given thread (to account for an object creating a small number of large objects), percentages or relative comparisons between different threads, and any combinations of these criteria. Of course, one of skill in the art will recognize that other criteria may be used.

Figure 5:
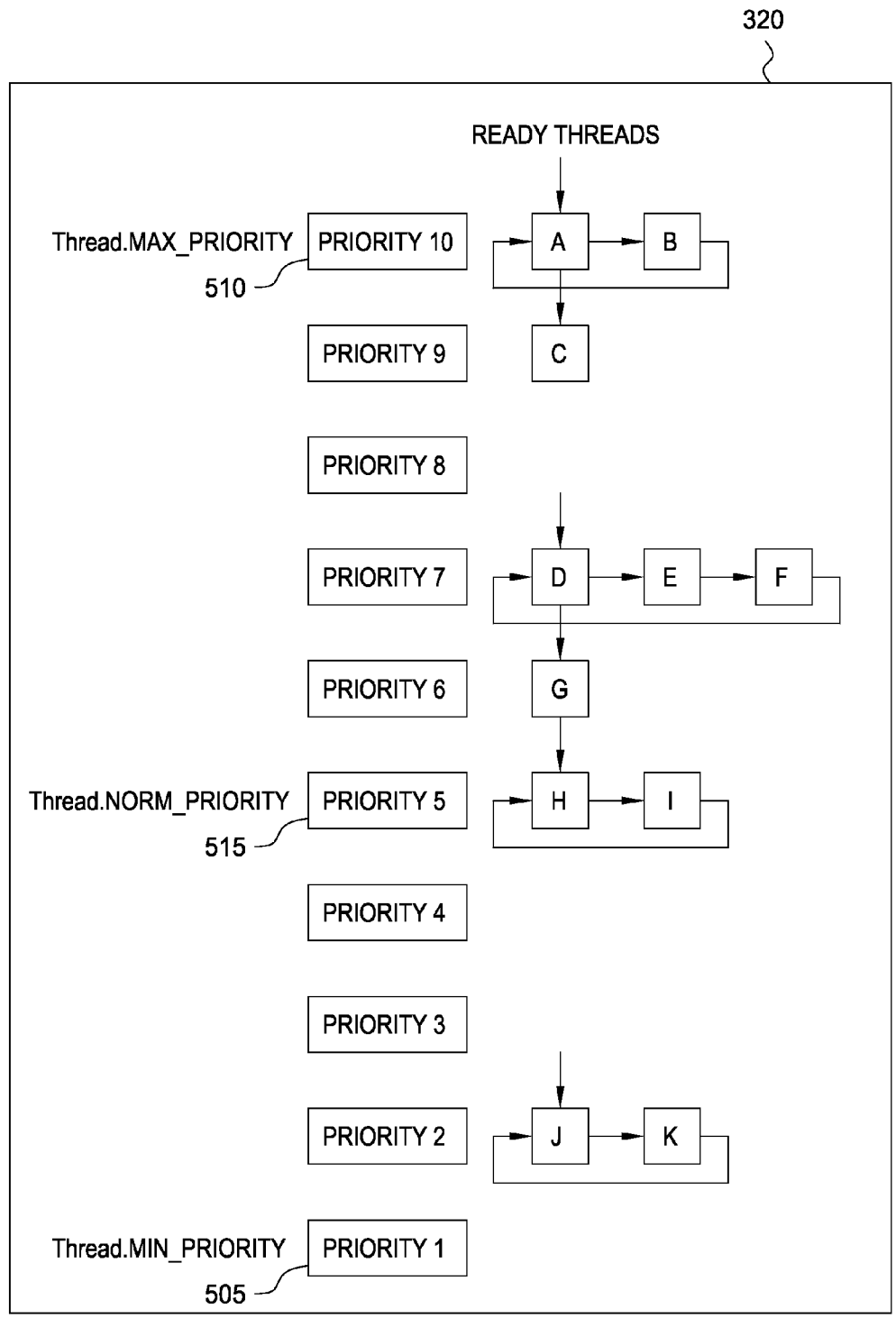
FIG. 5 is a block diagram that illustrates aspects of a thread pool, according to one embodiment of the invention.

FIG. 5 is a block diagram that further illustrates aspects of thread pool 320, according to one embodiment of the invention. Illustratively, thread pool 120 includes threads A-K, each with an assigned priority level raging from 1 to 10. Threads A and B are set to the highest level priority 510 of 10, threads H and I are set to a normal level priority 515 of 5, and threads J and K are set to a priority of 2, one level below a minimal thread priority 505. Assume for this example that each of threads A-K have been executing on virtual machine 210, and after a period of time, thread priority monitor 310 determines that threads J and K create objects at a rate that exceeds thread priority settings 405. In this example, the priority for these threads has been substantially reduced from the normal thread priority 515.

In one embodiment, thread scheduler 305 may perform thread scheduling by selecting the thread with the highest priority in a ready to execute state. For example, threads B, C and D are each ready for execution, B is dispatched. Conversely, if threads A, B, C, and D are each in blocked state, and E is ready for execution, thread E is dispatched. Thus, it can be seen that the "misbehaving" threads J and K are not selected for dispatch by thread scheduler 305 so long as any of the other threads A-I with a higher priority are in a ready state. Accordingly, by reducing the priority of threads with object creation rates that exceed thread priority settings 405, the disruption that these threads may have on overall system performance may be minimized.

Figure 6:
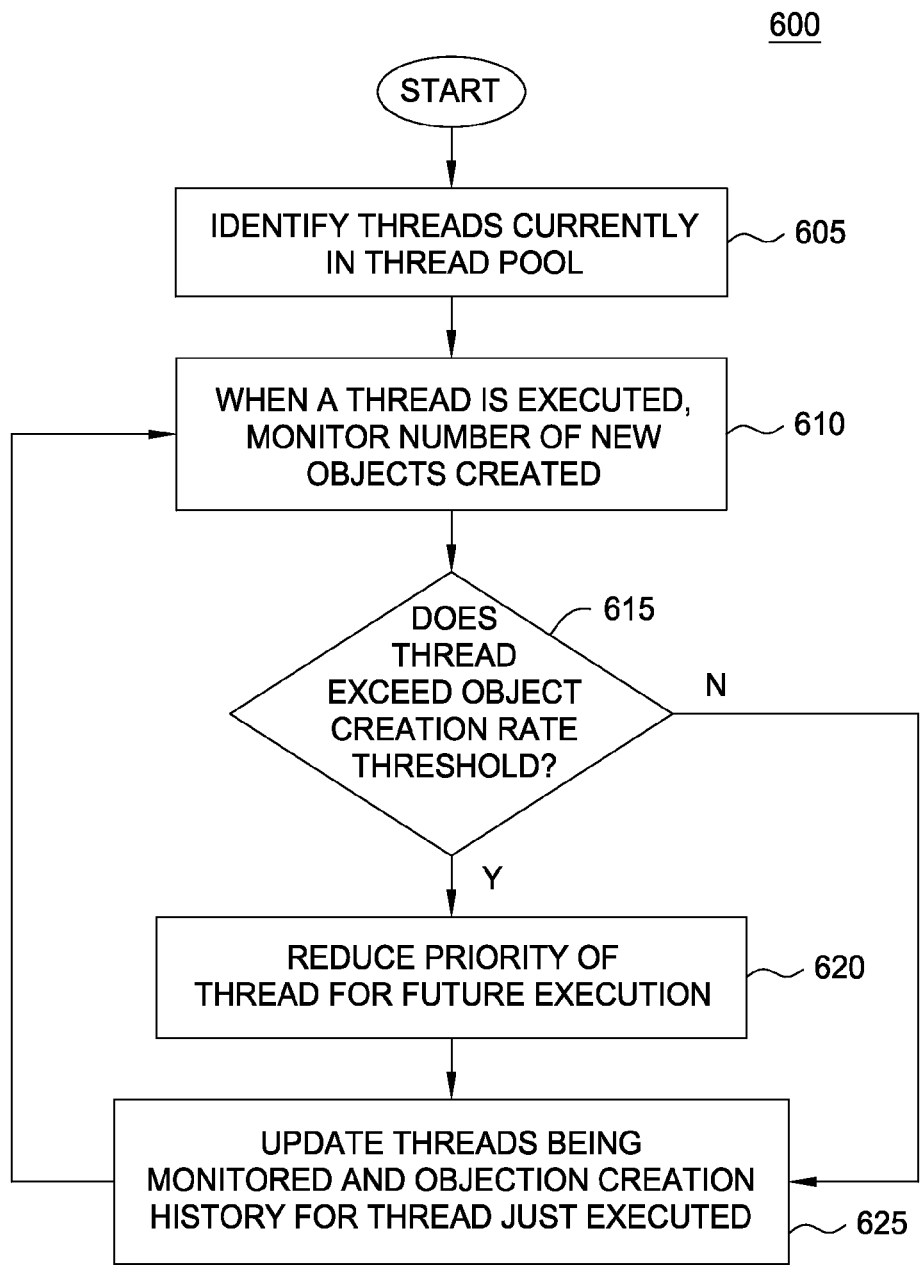
FIG. 6 is a flow chart that illustrates a method for managing thread priority based on object creation rates, according to one embodiment of the invention.

FIG. 6 is a flow chart that illustrates a method 600 for managing thread priority based on object creation rates, according to one embodiment of the invention. As shown, the method 600 beings at step 605 where the thread priority monitor 310 identifies the threads currently in thread pool 320. For each active thread, thread priority monitor 310 may be configured to determine the number of objects created each time the thread is dispatched. Accordingly, when thread scheduler 305 dispatches a thread for executing, thread priority monitor 310 may track the number of objects created while the thread is running. At step 615, the thread priority monitor 310 may determine whether the thread has exceeded the maximal object creation rates (however specified) by thread priority settings 405. If so, then at step 620, the thread priority monitor 310 may reduce the priority of that thread for future execution (step 620). Otherwise (or after reducing the priority of a "misbehaving" thread), the thread priority monitor 310 may update the threads being monitored and record the object creation rate for the thread just executed (step 625). This information may be used, for example, if the thread priority settings require a thread creation rate to exceed a given threshold for a number of dispatches before the priority is reduced. Of course, any combination of thread priority settings and object creation rates may be used to suit the needs in a particular case.

Advantageously, embodiments of the invention may be used to manage thread priority based on object creation rates. Because a sufficiently high object creation rate may lead to multiple garbage collection cycles, this behavior often leads to poor overall system performance. Embodiments of the invention provide a thread monitor configured to reduce the execution priority of a thread creating a sufficient number of new objects to be disruptive of system performance. Thus, although the thread may still create a large number of objects, by monitoring object creation rates and reducing the execution priority of such a thread, overall system performance may be improved. In other words, a given thread may still "misbehave," but receive fewer opportunities to do so.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing thread priority based on object creation rates, comprising:
    dispatching a first thread from a pool of active threads ready for execution by a virtual machine in a garbage collected computing environment, wherein each thread in the pool of threads is assigned to collectively perform a common task;
    calculating an object creation rate for the first thread by:
        resetting a counter when the first thread is dispatched for execution,
        incrementing the counter each time the first thread requests memory for an object, and
        calculating the object creation rate when the first thread finishes executing; and
    upon determining the object creation rate for the first thread exceeds a specified threshold, reducing an execution priority of each thread in the pool of threads,
    wherein the object creation rate is based on the creation of objects relative to a unit of time.

2. The method of claim 1, wherein the specified threshold is determined as a maximum number of objects that the thread may create when the thread is dispatched for execution.

3. The method of claim 1, wherein the specified threshold is determined as a percentage of memory allocated for use by the pool of active threads that the thread may request for allocation when the thread is dispatched for execution.

4. The method of claim 1, wherein the specified threshold is determined as a maximum amount of memory that the thread may request for allocation when the thread is dispatched for execution.

5. The method of claim 1, wherein the specified threshold is determined using two or more dispatches of the thread by a thread scheduler.

6. The method of claim 1, wherein the virtual machine is running on an application server configured to process requests from a plurality of client applications.

7. A computer-readable storage medium containing a program which, when executed, performs an operation, for managing thread priority based on object creation rates, comprising:
    dispatching a first thread from a pool of active threads ready for execution by a virtual machine in a garbage collected computing environment, wherein each thread in the pool of threads is assigned to collectively perform a common task;
    calculating an object creation rate for the first thread by:
        resetting a counter when the first thread is dispatched for execution,
        incrementing the counter each time the first thread requests memory for an object, and
        calculating the object creation rate when the first thread finishes executing; and
    upon determining the object creation rate for the first thread exceeds a specified threshold, reducing an execution priority of each thread in the pool of threads,
    wherein the object creation rate is based on the creation of objects relative to a unit of time.

8. The computer-readable storage medium of claim 7, wherein the specified threshold is determined as a maximum number of objects that the thread may create when the thread is dispatched for execution.

9. The computer-readable storage medium of claim 7, wherein the specified threshold is determined as a percentage of memory allocated for use by the pool of active threads that the thread may request for allocation when the thread is dispatched for execution.

10. The computer-readable storage medium of claim 7, wherein the specified threshold is determined as a maximum amount of memory that the thread may request for allocation when the thread is dispatched for execution.

11. The computer-readable storage medium of claim 7, wherein the specified threshold is determined using two or more dispatches of the thread by a thread scheduler.

12. The computer-readable storage medium of claim 7, wherein the virtual machine is running on an application server configured to process requests from a plurality of client applications.

13. A computing device, comprising:
a processor; and
a memory containing a program for managing thread priority based on object creation rates, comprising:
dispatching a first thread from a pool of active threads ready for execution by a virtual machine in a garbage collected computing environment, wherein each thread in the pool of threads is assigned to collectively perform a common task;
calculating an object creation rate for the first thread by:
resetting a counter when the first thread is dispatched for execution,
incrementing the counter each time the first thread requests memory for an object, and
calculating the object creation rate when the first thread finishes executing; and
upon determining the object creation rate for the first thread exceeds a specified threshold, reducing an execution priority of each thread in the pool of threads, wherein the object creation rate is based on the creation of objects relative to a unit of time.

14. The computing device of claim 13, wherein the specified threshold is determined as a maximum number of objects that the thread may create when the thread is dispatched for execution.

15. The computing device of claim 13, wherein the specified threshold is determined as a percentage of memory allocated for use by the pool of active threads that the thread may request for allocation when the thread is dispatched for execution.

16. The computing device of claim 13, wherein the specified threshold is determined as a maximum amount of memory that the thread may request for allocation when the thread is dispatched for execution.

17. The computing device of claim 13, wherein the specified threshold is determined using two or more dispatches of the thread by a thread scheduler.

18. The computing device of claim 13, wherein the virtual machine is running on an application server configured to process requests from a plurality of client applications.

* * * * *